Feb. 2, 1943.                W. ENGLUND                2,309,834
                            TEA OR COFFEE POT
                           Filed April 5, 1941
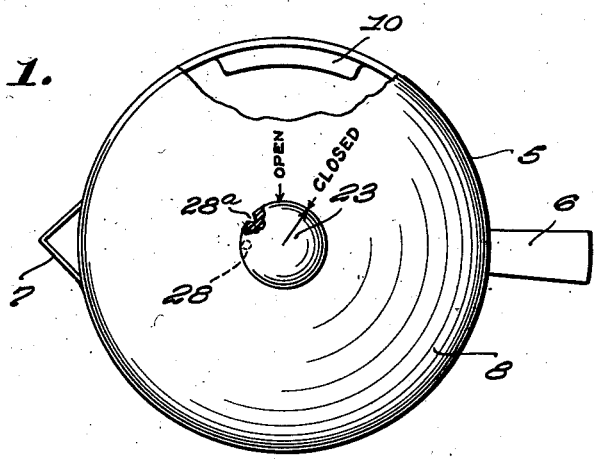
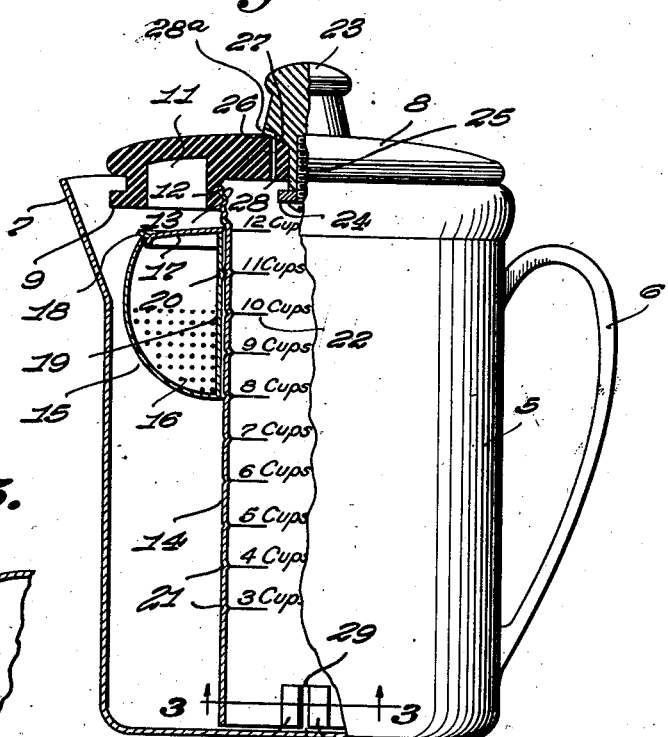
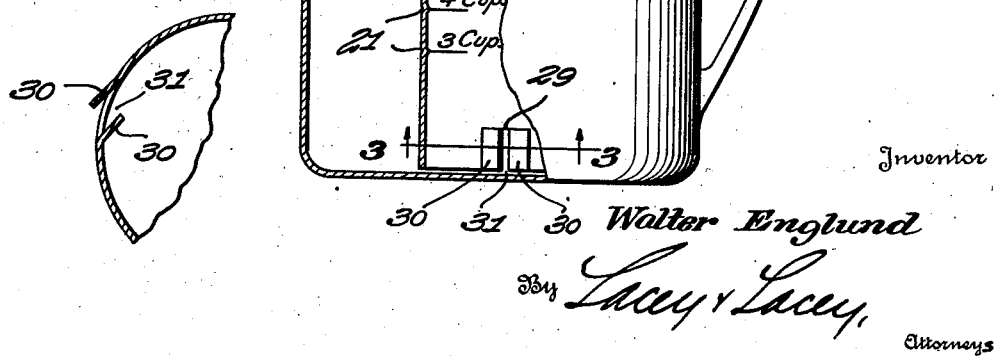
Inventor
Walter Englund
By Lacey & Lacey,
Attorneys Patented Feb. 2, 1943

2,309,834

UNITED STATES PATENT OFFICE 2,309,834

TEA OR COFFEE POT

Walter Englund, Mount Vernon, N. Y.

Application April 5, 1941, Serial No. 387,080

6 Claims. (Cl. 53—3)

This invention relates to devices for brewing beverages, and has for its object to provide a pot or other vessel, the construction of which is such that it may be used with equally good results either for making coffee or brewing tea.

A further object of the invention is to provide a beverage pot or vessel of simple and inexpensive construction having a tubular member depending from the cover thereof and on which is slidably mounted for vertical movement a container for coffee or tea, means being provided for causing the boiling water from the tubular member to contact with the ground coffee or tea leaves in the container without agitating the same during the brewing operation.

A further object is to form the cover of the pot or vessel with a vent opening communicating with the interior of the tubular member for releasing the steam pressure therein and to provide said cover with a weighted finger-engaging knob mounted for both rotary and vertical movement in the cover and serving to normally close said vent opening.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a top plan view of a brewing pot or vessel embodying the present invention, a portion of the top of the vessel being broken away to show the construction of the locking lugs for the cover, Figure 2 is a side elevation, partly in section, showing the manner of mounting the tea or coffee container in position on the tubular member, and Figure 3 is a transverse sectional view taken on the line 3—3 of Figure 2.

The improved brewing device forming the subject-matter of the present invention comprises a pot or vessel 5 of any desired size or shape and includes a handle 6 and a pouring spout 7. Fitted on the open end of the vessel 5 is a cover 8 having its lower end provided with a laterally extending flange 9 which fits beneath locking lugs 10 formed on the inner wall of the mouth of the pot for securing the cover in closed position. The lower face of the cover 8 is cut away at 11 to form a central boss 12, the interior walls of which are threaded at 13 for detachable engagement with the correspondingly threaded upper portion of a depending open-ended tubular member 14.

Slidably mounted for vertical movement on the tubular member 14 is an annular container 15 adapted to receive either ground coffee or tea leaves according to whether the pot is used for brewing tea or making coffee. The container 15 is perforated at 16 and is provided with a movable top or cover 17 by opening which the tea leaves or coffee may be readily inserted within the container. The outer end of the cover 17 is provided with a resilient lip 18 adapted to yieldably engage the adjacent body of the container for the purpose of holding the cover in closed position.

The inner annular wall 19 of the container is formed with a teat or lug 20 adapted to enter any one of a series of correspondingly shaped depressions 21 preferably formed by punching the metal constituting the tubular member 14 laterally, as shown. The tubular member 14 is provided with a series of graduations 22 indicating the number of cups of tea to be brewed or coffee to be made. The container 15 may be adjusted vertically of the tubular member to register with any desired graduation and in which position it will be securely held by frictional engagement of the teat 20 with the adjacent depression 21 in said tubular member.

The cover 8 is provided with a combined rotary and vertically movable finger knob 23, the lower end of which is provided with a weighted member or disk 24 secured by a screw or similar fastening device 25. The upper surface of the cover 8 is provided near the center thereof with an inclined portion or seat 26 adapted to receive the correspondingly inclined lower face 27 of the knob 23, there being a vent opening 28 formed in the cover at the seat 26 and a groove or trough 28a formed in the inclined face 27 of the finger knob for the purpose of releasing the steam pressure in the tubular member when desired.

The weight 24 normally holds the inclined face 27 of the finger knob over the vent opening 28 to close the same, but when said finger knob is elevated or rotated, the vent opening is exposed and steam from the tubular member permitted to escape.

When the finger knob is rotated until the arrow thereon is opposite the word "Open" on the cover 8, the groove 28a will register with the vent opening and permit the escape of steam pressure and when the arrow points to the word "Closed," the inclined face 27 of the knob will cover the vent opening and prevent the escape of steam pressure. Formed in the tubular member 14 adjacent the lower end thereof is a T-shaped incision 29, the walls of the tubular member at said incision being bent laterally in opposite directions to form parallel inclined lips 30 defining an opening 31 through which the liquid flows into the pot or vessel with a circular or swirling movement.

In making coffee the cover 8 with the tubular member attached thereto is first removed from the pot or vessel 5 and sufficient water placed in the pot to make, for instance, seven cups of coffee. Tea leaves or ground coffee is then placed in the container 15 and the latter adjusted vertically of the tubular member 14 until the teat or lug 20 enters the depression 21 opposite the proper graduation on said tubular member. The cover with the filled or partially filled container in position on the tubular member is then inserted within the pot or vessel 5 and the finger knob 23 elevated to expose the vent opening 28 for a few seconds and allow the water in the lower part of the tubular member to rise to the same level as the water in the pot. The finger knob is then allowed to drop under the influence of the weight 24 and close the vent opening.

When the water starts to boil, steam will form very quickly in the tubular member 14 and force the water in the tube downwardly through the open end thereof and also through the opening 31, thereby imparting a swirling movement to the liquid and raising the level of the water in the pot on the outside of the tubular member and bringing said water in contact with the coffee or tea leaves in the container. When the required time has elapsed for leaching, the knob 23 is rotated to open position, thus releasing the steam pressure in the tubular member and allowing the water or finished brew to again rise in the tubular member thereby lowering the level of the liquid in the pot to a position below the perforated container. The finished brew can then be poured through the spout 7 in the usual manner.

It will thus be seen that the finger knob 23 performs a three-fold function. First, as a grip or handle, second, to automatically vent the tubular member when assembling the parts, and third to manually vent the tubular member when the brew is finished.

Inasmuch as the ground coffee or tea leaves are confined within the container 15, liability of the coffee grounds or tea leaves mixing with the water is obviated and the necessity of passing the finished brew through a strainer before pouring the same into a cup is entirely obviated.

Having thus described the invention, what is claimed as new is:

1. A device of the class described comprising a liquid receiving vessel, a cover having a vent opening therein, a tubular member depending from the cover at said vent, said tubular member having its lower portion provided with an opening discharging into the vessel, the walls of said opening being bent laterally in opposite directions to form parallel inclined lips, a container for tea or coffee slidably mounted for vertical adjustment on the tubular member, means for holding the container in a set position of adjustment, and a finger knob slidably mounted for vertical movement within the cover for manually closing the vent opening.

2. A device of the class described comprising a liquid receiving vessel, a cover having a vent therein, a tubular member carried by and depending from the cover and having an opening in the lower end thereof, said tubular member being provided with vertically spaced depressions, a container for tea or coffee slidably mounted for vertical movement on the tubular member and having a portion of its inner wall pressed outwardly to form a locking teat adapted to selectively engage the depressions for holding the container in a set position of adjustment, and a finger knob mounted on the cover for normally closing the vent.

3. A device of the class described comprising a liquid containing vessel, a cover having an inclined seat and provided with a vent opening through said seat, a tubular member depending from the cover at said vent and having an opening in the lower end thereof, an annular perforated container adapted to receive tea or coffee slidably mounted on the tubular member, means for holding the container in a set position of adjustment, and a weighted finger knob mounted for vertical and rotary movement on the cover and having an inclined lower face normally closing said vent, said inclined face being provided with a groove adapted to register with the vent when the knob is rotated.

4. A device of the class described comprising a liquid containing vessel, a cover having a vent therein, a tubular member depending from the cover and having a substantially T-shaped incision therein, the walls of which are bent to form substantially parallel inclined lips, said tubular member being provided with graduations indicating the capacity of the liquid containing vessel, an annular container slidably mounted for vertical adjustment on the tubular member and provided with a locking teat, the material constituting the tubular member being pressed outwardly to form a plurality of vertically disposed depressions adapted to selectively receive said locking teat for holding said container in a fixed position of adjustment, and a finger knob normally closing said vent.

5. A device of the class described including a liquid containing vessel, a cover having an inclined seat and provided with a vent opening through said seat, a tubular member depending from the cover and surrounding said vent, a beverage container carried by the tubular member, and a finger knob having a lower inclined face mounted for both rotary and vertical movement on the inclined seat of the cover and having a groove formed in said inclined face adapted to register with said vent for releasing steam pressure in the tubular member.

6. A device of the class described including a liquid containing vessel, a cover having an inclined seat and provided with a vent opening through said seat, a tubular member carried by and depending from the cover and surrounding said vent, a beverage container carried by the tubular member, a weighted finger knob rotatably mounted for vertical movement on the cover and provided with an inclined face normally closing the vent, said knob when elevated uncovering the vent and having a groove formed in the inclined face thereof adapted to register with said vent when the knob is in lowered position and rotated on said cover.

WALTER ENGLUND.